A. P. STRONG.
AIR NOZZLE.
APPLICATION FILED MAY 20, 1920.
1,412,977.
Patented Apr. 18, 1922.
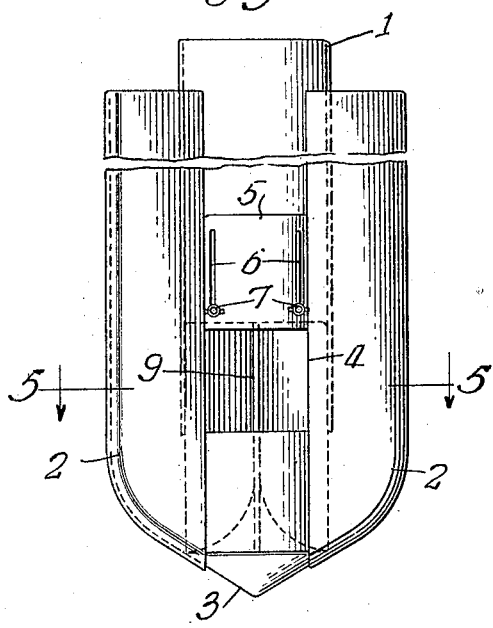
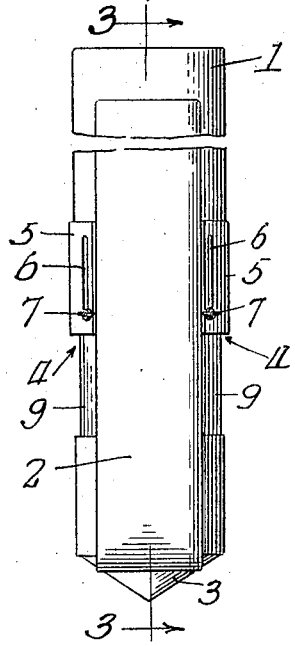
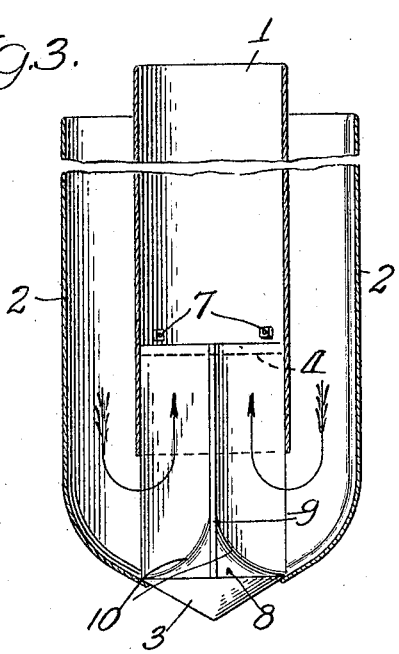
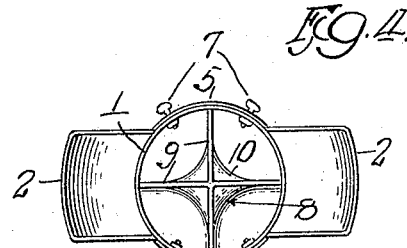
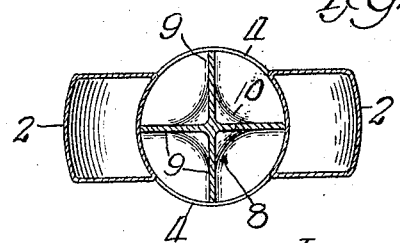
Inventor
Arthur P. Strong

UNITED STATES PATENT OFFICE.

ARTHUR P. STRONG, OF CHICAGO, ILLINOIS, ASSIGNOR TO GREEN ENGINEERING COMPANY, OF EAST CHICAGO, INDIANA, A CORPORATION OF ILLINOIS.

AIR NOZZLE.

1,412,977.  Specification of Letters Patent.  Patented Apr. 18, 1922.

Application filed May 20, 1920. Serial No. 382,996.

*To all whom it may concern:*

Be it known that I, ARTHUR P. STRONG, a citizen of the United States, residing at Chicago, in the county of Cook and State of Illinois, have invented new and useful Improvements in Air Nozzles, of which the following is a specification.

This invention relates to air nozzles used with conveyer hose and adapted to be forced endwise into a bed or mass of material, such as grain, for picking up pneumatically the material and directing it into the conveyer pipe line system of which the nozzle forms a part.

The objects of the invention will appear from the following specification and claims, taken in connection with the accompanying drawings, in which—

Fig. 1 is a side view of an air nozzle of my invention;

Fig. 2 is an end view of the same;

Fig. 3 is a longitudinal sectional view taken on line 3—3 of Fig. 2;

Fig. 4 is a top plan view of the nozzle; and

Fig. 5 is a transverse sectional view taken on line 5—5 of Fig. 1.

As shown in the drawing, the nozzle comprises a main conduit 1 and a plurality of air intake conduits 2, 2 extending along the main conduit on the outside thereof and secured thereto and terminating short of the upper end of said main conduit. This end of the latter is connected with the conveyer pipe or hose of the conveyer pipe line. Each conduit 2 has its upper end open to the atmosphere to permit air to be drawn into the same by the suction created in the system to carry the material being handled. The lower end of each conduit 2 opens into the conduit 1 adjacent the lower end of the same, and as the conduits 2, in the form of nozzle shown, are on opposite sides of the main conduit, the lower ends of the former open into the latter directly opposite each other, as clearly shown in Fig. 3. The lower end of the main conduit 1 is closed by a plug or cap 3, made conical to permit the nozzle to be readily forced into a mass or bed of grain or other material to be picked up by the nozzle. The grain or other material being handled enters the nozzle through two intakes or openings 4, 4 provided in the main conduit 1 above the lower ends of the air conduits 2 and arranged on opposite sides of the nozzle between said air conduits. Each intake 4 has a gate or closure 5, slidably mounted on the outside of the conduit 1 and curved to conform thereto and held closed or open by providing the gate with elongated slots 6, 6 and co-operating clamp bolts 7, 7.

When in use, the nozzle is forced endwise into a mass or body of grain or other material to be conveyed through the pipe line with the upper ends of the air intakes 2, 2 above the grain and open to the atmosphere. By the suction on the nozzle, currents of air are drawn into the main conduit 1 from below the material intakes 4, 4. Located in the nozzle is a deflector 8 on the cap 3 and having a length to extend above the intakes 4, as shown in Figs. 1 and 3. This deflector has a plurality of vanes 9, arranged at right-angles to each other, or substantially so, as shown in Fig. 5, so that there are two air passages crossing each intake 4. The deflector is formed so that the bottoms of these passages are curved, as at 10, to direct the air into said passages and also to reduce friction by avoiding sharp or abrupt corners. The deflector 8, being interposed between the entrances of the conduits 2 into the main conduit 1, prevents the air currents drawn into the nozzle from impinging head on, thereby avoiding friction and thus reducing the amount of power required to move the material through the system. The deflector and its vanes direct the air currents to the side of the main conduit 1 and across the intakes 4 and concentrate such currents at the intakes, thus gaining a maximum mingling of the air and material at the entry of the latter into the main conduit and causing the air currents to pick up the material as soon as it enters or drops into the nozzle. Thus the material is discharged as soon as it enters the nozzle into the high velocity air, as the deflector prevents the air currents from moving centrally of the nozzle across the material intakes and exerting practically no lifting effect on the material. By concentrating the air currents at the intakes 4, the air and material have a free chance to mix and enable the air to exert its maximum friction or lifting power thereon, thus reducing friction between the material and air and requiring less velocity at the point of pick up and less power to convey the material through the system.

While I have shown and described in detail herein an air nozzle of my invention, it is to be of course understood that the details of construction and arrangement of parts shown may be variously changed and modified without departing from the spirit and scope of my invention.

I claim as my invention:

1. An air nozzle, comprising a main conduit closed at its lower end and provided in its side wall with a material intake above said closed lower end, an air intake conduit carried by said main conduit and discharging into the latter between the material intake and the closed lower end of said main conduit, and means in said main conduit opposite the opening of the air conduit into the same for deflecting the air current drawn into said main conduit from said air conduit across said material intake and closely adjacent the same.

2. An air nozzle, comprising a main conduit closed at its lower end and provided in its side wall with a material intake above said closed lower end, an air intake conduit carried by said main conduit and discharging into the latter between the material intake and the closed lower end of said main conduit, and means in said main conduit opposite the opening of the air conduit into the same for deflecting the air current drawn into said main conduit from said air conduit along the inner surface of the main conduit and across the material intake therein.

3. An air nozzle, comprising a main conduit closed at its lower end and provided in its side wall with oppositely disposed material intakes above said closed lower end, a plurality of air intake conduits carried by said main conduit and discharging into the latter on opposite sides and below said material intakes, and a deflector in said main conduit between the openings of the air conduits into the same for directing the air currents drawn into said main conduit from said air conduits along the inner surface of said main conduit and across the material intakes therein.

4. An air nozzle, comprising a main conduit closed at its lower end and provided in its side wall with a material intake above said closed lower end, an air intake conduit carried by said main conduit and opening into the same between the material intake and the closed lower end of said main conduit, and a deflector in said main conduit opposite the opening of the air conduit into the same for directing the air current drawn into said main conduit from said air conduit along the inner surface of said main conduit and across the material intake therein, said deflector having vanes arranged to direct a plurality of air currents across said material intake.

5. An air nozzle, comprising a main conduit provided in its side wall with oppositely disposed material intakes above its lower end, a plurality of air intake conduits carried by said main conduit on the outside thereof and discharging into said main conduit opposite each other and below the material intakes therein, a conical plug closing the lower end of said main conduit, and a deflector in said main conduit between the openings of the air conduits into the same and seated on said plug, said deflector extending above said material intakes and directing the air currents drawn into the main conduit from said air conduits along the inner surface of the main conduit and across the material intakes therein, said deflector having a plurality of vanes arranged to direct a plurality of the air currents across each of said material intakes.

6. An air nozzle, comprising a main conduit closed at its lower end and provided in its side wall with oppositely disposed material intakes above said closed lower end, a plurality of air intake conduits carried by said main conduit, one for each of said material intakes and opening into the main conduit opposite each other and below said material intakes, a gate for closing each material intake and slidably mounted on the main conduit, and a deflector in said main conduit between the openings of the air conduits into the same and extending across the material intakes, said deflector having vanes arranged to direct a plurality of air currents across each of said material intakes.

7. An air nozzle, comprising a main conduit closed at its lower end and provided in its side wall with oppositely disposed material intakes above said closed lower end, a plurality of air intake conduits, one for each material intake, and carried by said main conduit on the outside thereof, said air conduits opening into said main conduit through the side wall thereof below said material intakes, gates for closing the material intakes and slidably mounted on the main conduit, and a deflector in said main conduit between the openings of the air conduits into the same and extending across said material intakes, said deflector having vanes arranged for directing a plurality of air currents across each material intake.

In testimony that I claim the foregoing as my invention, I affix my signature this 15th day of May, A. D. 1920.

ARTHUR P. STRONG.